United States Patent [19]

Lang

[11] 4,027,597

[45] June 7, 1977

[54] LINEAR INDUCTION MOTOR WITH DAMPING CAGE

[75] Inventor: Andreas Lang, Dachau, Germany

[73] Assignee: Krauss-Maffei Aktiengesellschaft, Munich, Germany

[22] Filed: Oct. 2, 1975

[21] Appl. No.: 618,924

[30] Foreign Application Priority Data

Oct. 3, 1974 Germany ........................... 2447183

[52] U.S. Cl. ................. 104/148 MS; 104/148 LM; 310/12
[51] Int. Cl.[2] ....................................... H02K 41/02
[58] Field of Search ............. 104/148 LM, 148 MS; 310/12, 13

[56] References Cited

UNITED STATES PATENTS 3,911,828   10/1975   Schwarzler ................. 104/148 LM

*Primary Examiner*—Trygve M. Blix
*Assistant Examiner*—Barry L. Kelmachter
*Attorney, Agent, or Firm*—Karl F. Ross; Herbert Dubno

[57] ABSTRACT

A linear induction motor, particularly for levitation-type vehicles (e.g., magnetic-suspension vehicles), has a stator juxtaposed with a reaction rail and formed with a plurality of longitudinally spaced windings or coils interdigitated with damping bars forming a damping cage with a pair of longitudinal conductors flanking the stator core. The latter is constituted by a lamination stack and is formed, in the region facing the reaction rail, with a plurality of slots in which portions of the coils are received. The slots increase in depth outwardly and the coils have portions which progressively recede from the reaction rail outwardly.

8 Claims, 6 Drawing Figures

LINEAR INDUCTION MOTOR WITH DAMPING CAGE

CROSS-REFERENCE TO RELATED APPLICATION

The present application is related to the commonly assigned copending application Ser. No. 546,748 filed Feb. 3, 1975 (Peter SCHWÄRZLER) and entitled LINEAR INDUCTION MOTOR, ESPECIALLY FOR HIGH SPEED SUSPENSION VEHICLES (now U.S. Pat. No. 3,967,561).

That application was in turn, related to commonly assigned copending applications: Ser. No. 425,615 filed Dec. 17, 1973 (U.S. Pat. No. 3,911,828), Ser. No. 324,135 filed Jan. 16, 1973 (U.S. Pat. No. 3,842,747) (entitled ELECTROMAGNETIC SUSPENSION AND GUIDANCE SYSTEM FOR VEHICLES ADAPTED TO SWITCH TRACKS), and Ser. No. 324,151 filed Jan. 16, 1973 (U.S. Pat. No. 3,842,749) (TRANSPORT SYSTEM WITH MAGNETIC SUSPENSION VEHICLES).

The latter applications were copending with and in turn referred to applications which have matured into the following patents relating to magnetic levitation or suspension systems, drive arrangements therefor for guidance systems: U.S. Pat. No. 3,797,403 and U.S. Pat. No. 3,780,668. See also application Ser. No. 280,074 filed Aug. 11, 1972 (U.S. Pat. No. 3,804,997) and Ser. No. 292,638 filed Sep. 27, 1972.

FIELD OF THE INVENTION

The present invention relates to linear induction motors and, more particularly, to a linear induction motor for a magnetic-suspension or other levitation-type vehicle such that lateral forces from the operation of the linear induction motor are minimized.

BACKGROUND OF THE INVENTION

In the above-identified applications there are described high-speed vehicles for interurban, intraurban and rural-urban transport of passengers and freight. In such systems frictional engagement of a vehicle with a road bed or track can be avoided by use of levitation principles, i.e., suspending the vehicle magnetically or on an air cushion at some distance from the juxtaposed road bed surface. While principal interest, for the purpose of the present invention, resides in electromagnetic suspension or levitation systems, it should be understood that principally hereof are also applicable to air-suspension systems.

In magnetic levitation systems, the vehicles are suspended by magnetic forces from the track which can be provided on opposite sides with a pair of substantially continuous armature rails.

Each side of the vehicle can be provided with rows of suspension electromagnets and a substantially constant suspension gap is maintained between the cores of the electromagnets and the armature rails by suitable circuitry.

For lateral guidance of the vehicle on the track, the suspension electromagnets and armature rails may be shaped as described in the aforementioned copending application so that the lateral centering forces are produced simultaneously with suspension forces, or additional laterally effective guide eletromagnets and corresponding armature rails may be provided.

Such suspension and guide systems avoid direct contact of the vehicle and the track except for wipers or the like which may be provided to enable the vehicle to pick up electric current from the track.

Similarly it has been attempted to replace the rotary drive motors of conventional vehicles with linear induction motors designed to apply a propelling force to the vehicle without moving parts other than the stator carried by the vehicle body and cooperating with a stationary reaction rail provided on the track. While the present linear induction motor is designed primarily for use with magnetic or other suspension or levitation vehicle systems, it should be noted that the principles here disclosed may be equally applicable to other vehicle drive arrangements.

In general, linear induction motors operate in accordance with eddy-current principles whereby the magnetic field bridging the stator and the reaction rail induces an eddy-current in a conductive layer or part of the rail or in the entire rail. This eddy-current reacts with the magnetic field of the stator and, by causing the field to move along the stator, i.e., by use of a plurality of coils energized in a rotary-field multiface system, a linear force is produced between the stator and the rail which, since the rail is fixed, propels the vehicle along the track.

In the case of a known linear induction motor (see "Elektrotechnische Zeitschrift," edition A, vol. 94, (1973), issue 2, page 97) the stator comprises an annular winding and an associated damping cage and is adapted to be displaced along an elongated stationary flat reaction rail arranged substantially horizontally. The breadth (-width) of the reaction rail of the known linear induction motor is the same as the outer limits of the stator, which limits are formed by two longitudinally extending conductors connecting the individual damping rods of the damping cage with each other. However, it has been found (see Dissertation by Mosebach, "Effekte der endlichen Lange und Breite bei asynchronen Linearmotoren in Kurzstander- und Kurzlauferbauform," Effects of the Finite Length and Breadth in the Case of Asynchronous Linear Motors of the Short Stator and Short Rotor Construction. Technische Universitat Braunschweig, Faculty for Machine Construction and Electrical Engineering, 1972, pages 25 to 29), that travsverse forces can occur perpendicularly to the desired advancing forces in the longitudinal direction of the linear induction motor. In the case of a departure from the symmetrical position of the stator in relation to the reaction rail these transverse forces will tend to move the stator further away from said symmetrical position.

As previously noted, a linear induction motor has significant utility for levitation-type vehicles which may be magnetically suspended from the guided along a track. As the vehicle travels along such a track, it is subjected to lateral imbalance forces arising from centrifugal action when the vehicle passes along an arcuate or curved track portion. Wind forces likewise introduce lateral imbalance. If the known linear induction motor is used to drive a hovering or levitation vehicle the above-mentioned transverse forces of the linear induction motor are added to the otherwise existing interfering or disturbing forces in the transverse direction which are produced by the track (centrifugal forces) and by the environment (wind forces).

Such added forces must be compensated for by suitable guiding arrangements provided on the track and/or on the hovering vehicle. Since these guiding arrangements provided on the vehicle should be made as small as possible in order to achieve the highest possible power weight ratio ( — intrinsic weight in relation to the load) and the lowest possible power consumption of the hovering vehicle, it is desirable to reduce the above mentioned transverse forces.

It is further known (Dissertation by Lang, "Einfluss der Streufelder auf Entwurf und Betriebsverhalten asynchroner Linearmotoren," (The Influence of Stray Fields on the Design and Operational Characteristics of Asynchronous Linear Motors), Technische Universitaet Braunschweig, Faculty for Machine Construction and Electrical Engineering, 1973, pages 88 to 91) to enlarge the breadth of the reaction rail so that it is greater than the overall breadth of the stator which results in a reduction of the undesired edge stray fields. However, an increase in the reaction rail breadth is often not possible owing to constructional reasons in the case of suspended or hovering vehicles, apart from strength problems and higher costs.

OBJECTS OF THE INVENTION

It is one object of the invention to create a linear induction motor which has an improved transverse stability while maintaining the same reaction rail breadth like prior art motors.

It is another object of the present invention to extend the principles described in the aforementioned applications with respect to levitation-type vehicles and especially to provide a linear induction motor particularly suitable for propelling such vehicles.

Still another object of the invention is to provide an electromagnetically suspended vehicle system having an improved drive means.

SUMMARY OF THE INVENTION

These objects and others which will become apparent hereinafter are attained in accordance with the present invention, in a linear induction motor especially for a levitation-type vehicle (particularly a magnetic suspension vehicle) which comprises an elongated stator core juxtaposed with a reaction rail and formed with a plurality of annular coils in longitudinally spaced relationship, the coils collectively forming the stator winding. Between the coils there are provided damping bars which extend at least partly around the core and are electrically connected together by a pair of conductors flanking the core, which bars and conductors collectively form a damping cage.

According to the invention, the stator core is slotted in the regions juxtaposed with the reaction rail with slots which deepen outwardly from a central location of the core, the coils having portions received in the slots which likewise diverge outwardly away from the reaction rail.

More specifically, therefore, the linear induction motor comprises at least one stator disposed at least on one side of a stationary reaction rail and carried by the levitation-type vehicle. The stator has a core consisting of at least one lamination stack provided with slots and carrying a winding formed by a plurality of annular coils surrounding the core.

The stator also is formed with a damping cage consititued by a plurality of damping bars, each corresponding to one of the coils, the damping bars being interspaced with the coils and being electrically connected by a pair of conductors extending parallel to the sides of the stator.

The slots are arranged perpendicularly with respect to the longitudinal dimension of the motor in that the surface of the lamination stack which is juxtaposed with the reaction rail and each of the slots receives the part of a respective annular coil proximal to the reaction rail. The slots are provided adjacent the two faces of the stator with increasing slot height.

The coil portions received in the slots including a central horizontally oriented portion or section and two peripheral, linearly rising or diverging sections, the slot being correspondingly shaped.

The angle included between the horizontal section and each outermost section is so selected that the longitudinal conductors (of the cage) are arranged substantially completely beneath the respective coil immediately adjacent the lamination stack consitituting the core.

The angle is most preferably chosen that the projection of each peripheral coil section or a horizontal plane (more specifically a plane parallel to the reaction rail) is at least equal to 1.5 times the breadth of the longitudinal conductors measured parallel to this plane. The projection of each peripheral coil section on a vertical plane (more specifically a plane perpendicular to the reaction rail but parallel to the longitudinal dimension of the motor) is at least equal to twice the height of the longitudinal conductors as measured along this plane.

The lamination stack can be constructed in two parts with a parting plane extending parallel to the reaction rail to facilitate assembly of the motor.

In the case of the linear induction motor in accordance with the invention the longitudinally extending conductors of the damping cage can be arranged substantially closer to the lamination stack of the stator than is the case with known motors so that as compared with the latter while maintaining the same reaction rail breadth, the overall breadth of teh stator can be reduced without any loss in motor power, which results in a substantial reduction of the transverse force.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 6:
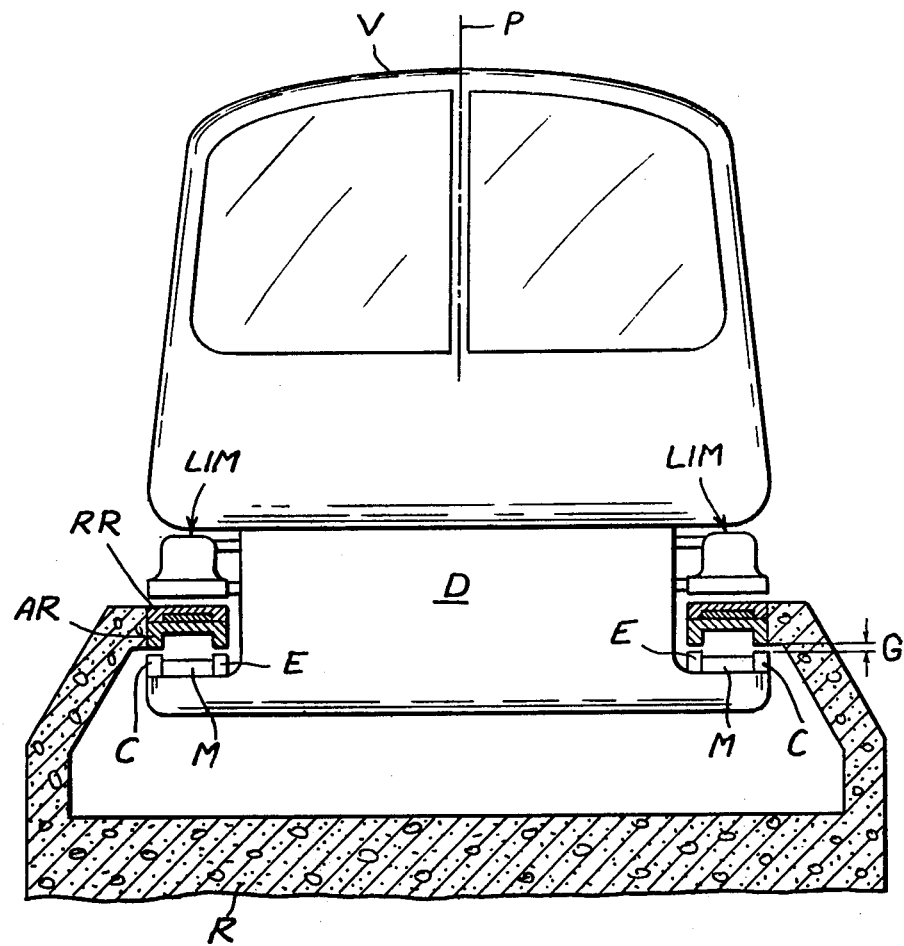
FIG. 6 is a view of a vehicle system embodying the invention.

Referring first to FIG. 6, it will be seen that the vehicle V displaceable along the track R has a depending structure D on whose laterally extending arms are carried suspension electromagnets E and cores C and magnetic coils M.

The suspension electromagnets E are provided symmetrically on opposite sides of a longitudinal median plane P through the system. On each side, moreover, the vehicle is provided with linear induction motors LIM which cooperate with reaction rails RR, here shown to be bonded to inverted U-section armature rails AR which coact with the suspension and guide electromagnets E, to support the vehicle.

As a result, the vehicle is suspended by a gap G which can be controlled by any of the means described in the aforementioned copending applications.

The particular construction of the electromagnets and armature rails, the use of main and auxiliary electromagnets to permit switching and the like may all be in accordance with the principles described in the aforementioned copending applications.

In the balance of this specific description I describe in greater detail the improvement relating to linear induction motors which may be used at LIM in the vehicle system.

Figure 1:
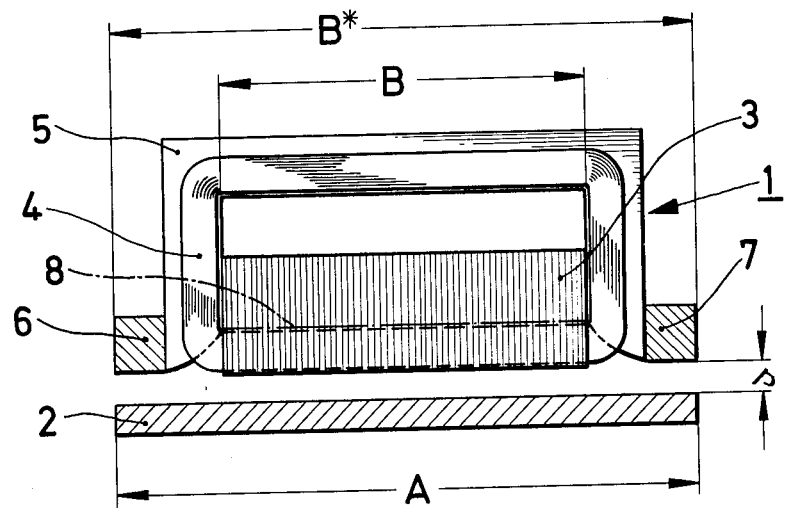
FIG. 1 is a transverse section through a prior-art linear induction motor comprising annular coils and an associated damping cage.

The one sided linear induction motor shown in FIG. 1 is disclosed in the already mentioned reference "Elektrotechnische Zeitschrift" and comprises a stator 1, which is arranged at a distance s from the upper surface of a reaction rail 2. The stator 1 comprises a laminated iron stack 3 of the breadth B, a plurality of annular coils 4 and the same plurality of damping rods 5 respectively associated with one of the coils 4. Between the upper edge of the lamination stack 3 and the adjacent lower edge of each damping rod 5 or, respectively, of each coil 4 there is provided a free intermediate space, whose height corresponds substantially to the height of the coils 4. This enables the use of preformed coils or windings, which possibility is essential in the case of large linear motors. The damping rods 5 are electrically connected with each other on the two lateral sides of the stator 1 by means of longitudinal conductors 6 and 7, thereby forming, in combination with the conductors 6, 7 a damping cage. The distance between the outer edges of the longitudinal conductors 6 and 7 forms the effective stator breadth B*, which is equal to the breadth A of the reaction rail 2 in the case of the example shown.

Figure 2:
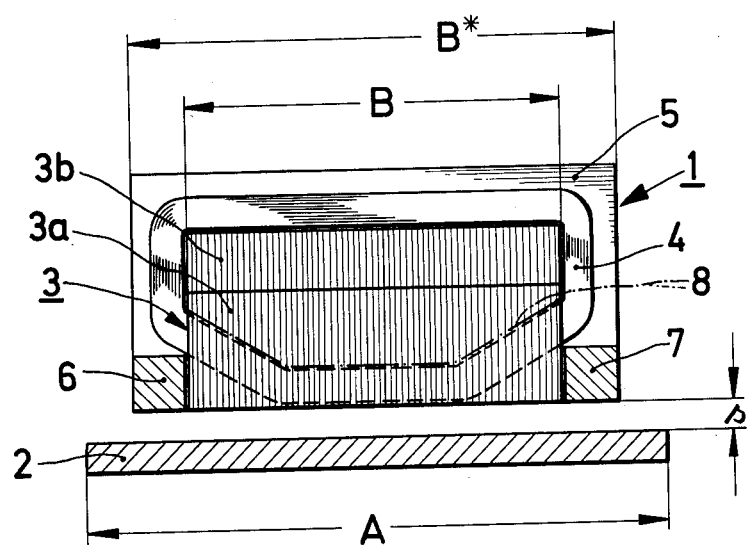
FIG. 2 is a cross-section through a linear induction motor in accordance with the invention which is of the same type as the motor of FIG. 1.

The linear induction motor in accordance with the invention represented in FIG. 2 firstly differs from the motor in accordance with FIG. 1 as regards a different shaping of the slots 8 of the lamination stack (said slots being indicated with dot dash lines) which slots 8 are each passed by a corresponding coil 4. Thus while in the case of the prior-art motor in accordance with FIG. 1 the slots 8 have a constant dimension in the vertical direction (constant height), in the case of the motor of the invention the slot height is made larger adjacent to the lateral sides of the motor. This means that each slot 8 has a central horizontal section with a constant slot height and two peripheral sections with a linearly increasing slot height. It will be apparent from FIG. 2 that the course of the coils 4 in the respective slot 8 is adapted to the shape of the slot, so that the section of each coil 4 lying in the corresponding slot 8 also has a central horizontal section and two linearly arising peripheral sections. Owing to the linear arise of the above mentioned peripheral sections of the coil 4 the longitudinal conductors 6 and 7 of the damping rods 5 can be arranged in the space underneath the peripheral sections of the coils 4 and therefore very close to the lamination stack 3. By this way the distance between the outer edges of the longitudinal conductor 6 and accordingly the effective stator breadth B* is made smaller in the case of the inventive motor than is the case with the prior-art motor in accordance with FIG. 1. Under the provision that the breadth A of the reaction rail 2 is equal it is obvious from the above that the reaction rail 2 of the inventive motor projects beyond the lateral sides of the stator 1, which results on the one hand to a reduction in the transverse forces (see the initially mentioned Dissertation by Lang) and on the other hand in a reduction of the stray field so that in effect the power factor ($\cos \phi$) of the inventive motor is improved.

A further difference between the inventive motor and that known motor in accordance with FIG. 1 relates to the separation of the lamination stack 3 in a lower part 3a and an upper part 3b, wherein the parting plane of said separation extends parallel to the reaction rail 2. The lower part 3a of the lamination stack 3 is provided with the slots 8 whereas the upper part 3b is placed after insertion of the coils 4 in the space between the lower part 3a and the upper horizontal section of the coils 4. The parts 3a and 3b of the lamination stack 3 are connected together in a sufficient manner which is not shown, for example by screw means. By that provision it is possible to use pre-formed coils or windings when producing the linear motor according to the invention without tolerating the sacrifice of the presence of the intermediate space, shown in FIG. 1, between the upper edge of the lamination stack and the adjacent lower edge of the coil. This results in a reduced overall height, provided that there is a comparable height of the lamination stack, and further in reduced stray effect.

It wil be understood that the inventive principle is not restricted to one-sided linear induction motors and may be transferred to double-sided linear induction motors in the case of which the stator comprises two stator halves arranged in a mirror-symmetrical fashion with respect to the reaction rail. It is further possible to form the slots in a different shape providing the sufficient space is left available underneath the peripheral coil sections in order to arrange the longitudinal conductors as close as possible to the lamination stack.

Figure 3:
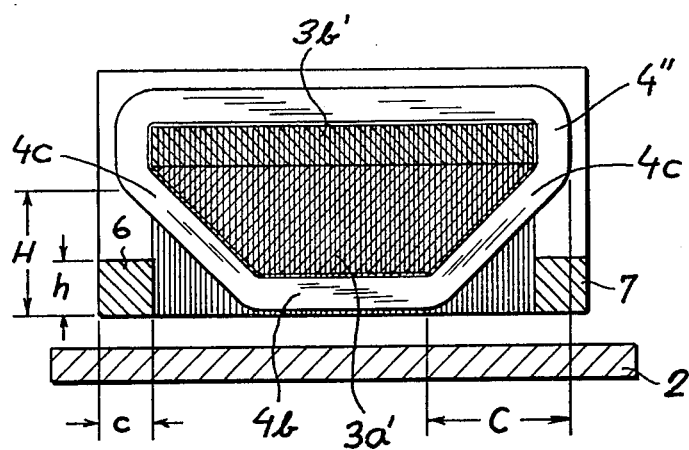
FIG. 3 is a view similar to FIG. 2 but illustrating a further modification of the invention.

As can be seen in FIG. 3, the slots of the two-part stator core 3a' and 3b' can be arranged so that the angle $\alpha$ between the horizontal section 4b and the rising sections 4c of the coil 4" is greater than that shown in FIG. 2 whereby the projection H on a vertical plane of the section 4c is at least equal to twice the height $h$ of the conductors 6, 7. The length of the peripheral sections 4c may also be increased so that the projection in a horizontal plane has a dimension K which is equal to at least $1.5k$, the horizontal breadth of the longitudinal conductors 6, 7.

Figure 4:
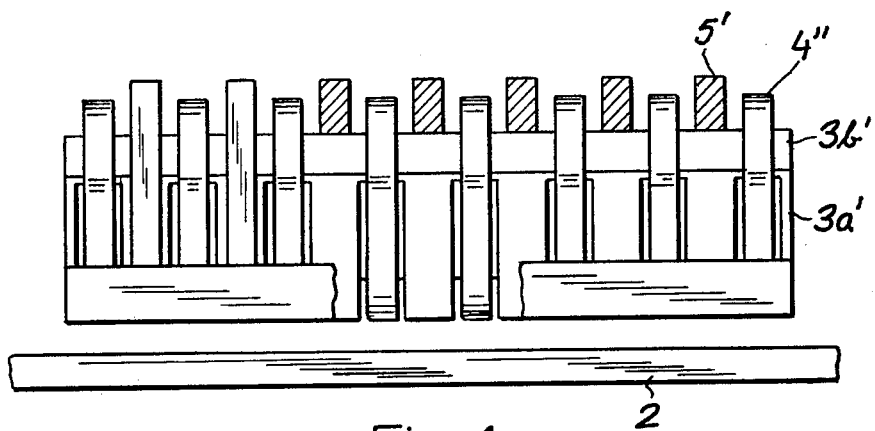
FIG. 4 is a side view of the linear induction motor, partly broken away and diagrammatically formed.

The slots, stator and damping bars are shown in greater detail in FIG. 4.

Figure 5:
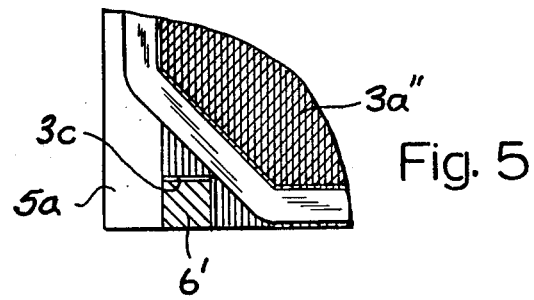
FIG. 5 is a detail view showing another arrangement of the windings and the cage conductors.

In the system of FIG. 5, the conductor 6' interconnecting the damping bars 5a are shown to lie wholly beneath the peripheral portion 4c' of a coil for the stator 3a" which may be provided with a recess 3c to accommodate this conductor.

I claim:

1. A linear induction motor comprising a longitudinally extending reaction rail having an active face; and an elongated stator juxtaposed with said face of said rail, said stator comprising a core formed from at least one lamination stack and having a side confronting said face and formed with a plurality of transverse slots spaced apart in the longitudinal direction, said slots diverging outwardly to their ends away from said reaction rail, respective longitudinally spaced polygonal coils extending around said core and having portions received in said slots and diverging outwardly away from said rail, and a damping cage including a pluarlity of damping bars extending partly around said core and a pair of longitudinally extending conductors flanking said core and electrically connecting said damping bars.

2. The linear induction motor defined in claim 1 wherein said bars are interspaced with said coils, and said portions of said coils include central horizontal sections and inclined sections extending laterally outwardly of said horizontal sections, said inclined sections forming an angle with said horizontal sections sufficient to enable said conductors to be disposed substantially completely inwardly of the outermost parts of each coil immediately adjacent the lamination stack.

3. The linear induction motor defined in claim 2 wherein said angles are selected such that the projection of each inclined coil section on a horizontal plane is at least equal 1.5 times the breadth of said conductors and the projection of each inclined coil section on a vertical plane is at least equal to twice the height of the conductors.

4. The linear induction motor defined in claim 1 wherein said core comprises two lamination stacks with a parting plane extending parallel to the reaction rail.

5. An electromagnetic suspension vehicle system comprising a track, a vehicle displaceable along said track, a pair of transversely spaced armature rails extending longitudinally along said track, respective electromagnets carried by said vehicle and juxtaposed with said armature rails for suspending said vehicle from said track, a reaction rail carried by said track and having a flat face, and a linear induction motor carried by said vehicle, said motor having a stator, said stator comprising a core formed from at least one lamination stack and having a side confronting said face and formed with a plurality of transverse slots spaced apart in the longitudinal direction, said slots diverging outwardly at their end away from said reaction rail, respective longitudinally spaced polygonal coils extending around said core and having portions received in said slots and diverging outwardly away from said rail, and a damping cage including a plurality of damping bars extending partly around said core and a pair of longitudinally extending conductors flanking said core and electrically connecting said damping bars, 6. The vehicle system defined in claim 5 wherein said bars interspaced with said coils, and said portions of said coils include central horizontal sections for inclined sections extending laterally outwardly of said horizontal sections, said inclined sections forming an angle with said horizontal sections sufficient to enable said conductors to be disposed substantially completely inwardly of the outermost parts of each coil immediately adjacent the lamination stack.

7. The vehicle system defined in claim 6 wherein said angles are selected such that the projection of each inclined coil section on a horizontal plane is at least equal 1.5 times the breadth of said conductors and the projection of each inclined coil section on a vertical plane is at least equal to twice the height of the conductors.

8. The vehicle system defined in claim 5 wherein said core comprises two lamination stacks with a parting plane extending parallel to the reaction rail.

* * * * *